(12) United States Patent
Hinderegger et al.

(10) Patent No.: US 11,234,551 B2
(45) Date of Patent: Feb. 1, 2022

(54) DISPENSER PREPARING BEVERAGES FROM POWDERS

(71) Applicant: NESTEC S.A., Vevey (CH)

(72) Inventors: Erich Hinderegger, Lochau (AT); Patrick Fluck, Busswil (CH); Roberto Angelo Calderone, Orny (CH); Cedric Rey, La Sarraz (CH)

(73) Assignee: Societe des Produits Nestle S.A., Vevey (CH)

( * ) Notice: Subject to any disclaimer, the term of this patent is extended or adjusted under 35 U.S.C. 154(b) by 955 days.

(21) Appl. No.: 15/329,389

(22) PCT Filed: Jul. 28, 2015

(86) PCT No.: PCT/EP2015/067268
§ 371 (c)(1),
(2) Date: Jan. 26, 2017

(87) PCT Pub. No.: WO2016/016240
PCT Pub. Date: Feb. 4, 2016

(65) Prior Publication Data
US 2017/0215629 A1    Aug. 3, 2017

(30) Foreign Application Priority Data

Jul. 30, 2014  (EP) .................................... 14179073

(51) Int. Cl.
*A47J 31/40* (2006.01)
*A47J 31/44* (2006.01)

(52) U.S. Cl.
CPC ......... *A47J 31/401* (2013.01); *A47J 31/4403* (2013.01)

(58) Field of Classification Search
CPC .......... A47J 31/40; A47J 31/44; A47J 31/401; A47J 31/4403; A47J 31/60; A47F 1/08; B67D 5/60; B67D 5/58
See application file for complete search history.

(56) References Cited

U.S. PATENT DOCUMENTS

| 3,268,119 A | 8/1966 | Kopera |
| 6,237,468 B1 | 5/2001 | Erikawa |

(Continued)

*Primary Examiner* — Hong T Yoo
(74) *Attorney, Agent, or Firm* — K&L Gates LLP

(57) ABSTRACT

The invention concerns a beverage dispenser comprising:—a housing (4)—at least two containers (2) for storing a water soluble beverage powder, each container comprising a tank (21) and an outlet (22),—at least two dissolution chambers (3), each being operatively linked to one of the containers (2) for preparing a beverage from the water soluble beverage powder and a diluent,—for each dissolution chamber (3), an extractor hood (5) at the top of said dissolution chamber,—an evacuating fan (6),—an extraction device (7) connected to each extractor hood (5) and to said evacuating fan (6), said extraction device comprising internal paths (71) for guiding flows from the extractor hoods through the extraction device, wherein:—the extraction device (7) is an essentially parallelepipedic box connected: to each extractor hood (6) through cooperating holes (71) on its front lateral side, and to the evacuating fan (36) through one cooperating holes (72) on one other lateral side,—the box of the extraction device is fully removable from the housing (4),—the box consists of a lower part (7a) and an upper part (7b) and is configured for being manually opened by separating the lower part (7a) from the upper part (7b).

12 Claims, 7 Drawing Sheets

(56) References Cited

U.S. PATENT DOCUMENTS

2007/0272699 A1* 11/2007 Girault ............... B65D 11/1826
  220/666
2009/0183641 A1* 7/2009 Verhoeven ............ A47J 31/401
  99/323.3
2014/0150669 A1* 6/2014 Green .................. B67D 1/0058
  99/323.2

* cited by examiner

DISPENSER PREPARING BEVERAGES FROM POWDERS

CROSS REFERENCE TO RELATED APPLICATIONS

The present application is a National Stage of International Application No. PCT/EP2015/067268, filed on Jul. 28, 2015, which claims priority to European Patent Application No. 14179073.3, filed Jul. 30, 2014, the entire contents of which are being incorporated herein by reference.

FIELD OF THE INVENTION

The present invention relates to beverage dispensers preparing beverages from a soluble power stored in a container and in which a dose of powder is dispensed from the container into a dissolution chamber to be mixed with a diluent.

BACKGROUND OF THE INVENTION

Many beverages like espresso and other coffee beverages, milk beverages, chocolate beverages, . . . are often prepared by mixing a soluble beverage powder with a diluent. The soluble beverage powder is usually stored in a tank or canister provided with a dosing device in order to deliver a dose of beverage powder in a mixing device. Mixing devices typically comprise a dissolution chamber in which the soluble component and the diluent are fed. The diluent can be introduced into the dissolution chamber in order to create a whirlpool to efficiently dissolve the soluble component in the hot water or the hot diluent can be introduced under the form of jets that provides mixing, dissolving and frothing. The mixture can also eventually be frothed by a whipper in the dissolution chamber to reconstitute the beverage and produce foam. The beverage is then usually evacuated into a receptacle for drinking.

The food soluble powder is usually stored in a container placed above the dissolution chamber opened mouth and a dosing device like a screw or an auger doses and delivers the food soluble powder which falls in the dissolution chamber. The top of the dissolution chamber usually comprises an extractor hood connected to an evacuation fan in order to suck steam and powder fines flying above the dissolution chamber during the beverage preparation. The extractor hood avoids that steam flows up to the powder dosing device and the powder tank which would lead to a caking of the powder in these devices. The extractor hood avoids that fines of powder fly in the internal housing of the beverage preparation machine too.

WO 2007/142519 describes a beverage preparation machine such as described above comprising a particular extraction duct connecting the extractor hoods of the dissolution chamber with a ventilating fan. The extraction duct extends along the longitudinal side of the internal housing and at least one of the walls of the duct is a wall of the internal housing. Consequently at least one wall of the internal housing becomes dirty during the operation of the machine and has to be regularly cleaned.

In this prior art the beverage dispenser comprises a plurality of mixing chambers and each mixing chamber comprises a separate extraction duct. No sections exist in the extraction ducts so that there is no accumulation of powdery particles in those sections. For this reason a filter is accommodated in the extraction duct to prevent soiling of the ventilating fan by the steam and powder fines in the sucked air. This filter has to be very frequently cleaned or even changed because it traps all the powder fines. Another drawback of the filter is that it decreases the strength of the air flow sucked by the fan and the fan has to be energized at a high power to maintain a sufficient sucking upstream to the filter.

GB 2345252 describes a beverage preparation machine such as described above and comprising a box connecting a toroidal jacket—positioned around the dissolution chamber opened mouth—with an expeller fan. The box comprises a cover and internal baffles. The baffles create a meandering path that encourages powder depositing in the interior of the box.

The cleaning of such a box is not easy due to the fact that one part is attached to the dissolution chamber and the other part is attached to the extractor hood.

The design of the meandering path by the baffles induces an important pressure drop of the sucked air. Consequently the expeller fan must create a strong sucking to get sufficient sucking at the level of the extractor hood.

Finally this prior art does not provide a solution for a beverage preparation machine comprising several dissolution chambers.

The aim of the present invention is to propose a solution to the above problems and to propose a beverage dispenser preparing beverages from soluble powder ingredients, said dispenser comprising an extraction device that can be easily and rapidly dismantled for cleaning.

Another aim of the present invention is to propose such a dispenser wherein the extraction device sucks as less as possible the powder dosed in the dissolution chamber Another aim of the present invention is to propose such a dispenser wherein no filter is present in the extraction device.

Another aim of the present invention is to propose such a dispenser wherein the efficiency rate of the evacuation fan is optimised.

SUMMARY OF THE INVENTION

According to a first aspect, the invention concerns a beverage dispenser comprising:
  a housing,
  at least two containers for storing a water soluble beverage powder, each container comprising a tank and an outlet,
  at least two dissolution chambers, each being operatively linked to one of the containers for preparing a beverage from the water soluble beverage powder and a diluent,
  for each dissolution chamber, an extractor hood at the top of said dissolution chamber,
  an evacuating fan,
  an extraction device connected to each extractor hood and to said evacuating fan, said extraction device comprising internal paths for guiding air flows from the extractor hoods through the extraction device,
wherein:
  the extraction device is an essentially parallelepipedic box connected:
    to each extractor hood through cooperating holes on its front lateral side, and
    to the evacuating fan through one cooperating holes on one other lateral side,
  the box of the extraction device is fully removable from the housing, the box consists of a lower part and an upper part and is configured for being manually opened by separating the lower part from the upper part.

By essentially parallelepipedic box, it is meant that the extraction device comprises six walls disposed one to the other like a parallelepiped. Accordingly the extraction device forms an essentially parallelepipedic volume that is closed—except for the connections to the evacuating fan and the dissolution chamber. Consequently only the internal walls of this box come into contact with the steam and the powder sucked form the dissolution chambers. This box avoids any contact between the internal walls of the dispenser and the sucked flow of steam and powder.

By fully removable it is meant that the complete parallelepipedic box is made removable from the dispenser, that is to say all the six walls of the extraction device box are removable. Consequently, all said walls in contact with extracted steam and powders are removable from the dispenser and can be easily cleaned outside of the dispenser, for example on a working surface or even within a washing dish machine. The cleaning of this extraction device becomes efficient because the operator does not have to clean the dirty parts of the extraction device within the dispenser sometimes in an uncomfortable position and without a correct light.

Preferably the lower part and the upper part of the box are assembled along a hinge, said hinge being positioned on one of the lateral side of the box, the box being openable along said hinge.

Accordingly the operator does not have to think of the way of assembling the lower part and the upper part when putting back the box in the dispenser. He just has to close the box along the hinge.

Preferably the extraction device comprises at least one device for removably attaching the upper and lower parts of the box together. For example, the extraction device can comprise latches, clips or snapping members.

Preferably the housing of the dispenser presents an area configured for receiving the extraction device. According to the preferred embodiment said area presents the shape of a shelf on which the extraction device is able to be slid.

According to a specific embodiment the box of the extraction device can comprises at least one magnet or metallic piece, said magnet or metallic piece being positioned in order to cooperate with a metallic piece or magnet respectively inside the area configured for receiving the extraction device.

Preferably the internal paths for guiding air flows from the extractor hoods through the extraction device are designed by walls internally extending from the lower part surface and/or the upper part surface of the box of the extraction device.

Preferably the internal paths for guiding flows from the extractor hoods through the extraction device are designed so that the flows of air sucked through each hole cooperating with the extractor hoods are almost equal.

Preferably the internal paths designed by the walls are also configured for creating a trap for steam by enabling condensation of steam along the walls.

Accordingly there is no need to introduce a filter within the extraction device that has to be changed or that is difficult to clean. The very simple construction of the extraction device makes it very easy to clean.

Preferably the beverage dispenser comprises an evacuation duct for evacuating air sucked from the evacuation fan, said evacuation duct guiding air from the evacuation fan down to the bottom of the dispenser.

Preferably the evacuation duct extends vertically along one lateral wall of the housing.

According to the preferred embodiment the evacuation duct is a rectangular conduit consisting in a three longitudinal side conduit attached to the external surface of the lateral wall of the housing, said surface forming the fourth side of the conduit.

The evacuation duct is preferably dismountable.

According to a second aspect the invention concerns a process for the preparation of a beverage with a beverage dispenser such as described above wherein the following steps are implemented:

a)—a dose of beverage powder is dispensed from the powder outlet of one container and delivered to one dissolution chamber through the chute, b)—a dose of diluent is delivered in the dissolution chamber and mixed with the dose of powder to produce a beverage, c)—the produced beverage is delivered through the chamber outlet, wherein during at least the whole step b) air is sucked from the extraction device so that essentially equal flows (F) of air are sucked through each hole cooperating with one extractor hood.

In general air is sucked from the extraction device during the whole process, meaning all the steps a) to c).

Preferably the flow rate of air sucked by the evacuation fan is controlled so that the flow rate of air sucked from each hole cooperating with one extractor hood is comprised between 1 m/s and 3 m/s, preferably comprised between 1.5 and 2.5 m/s, even more preferably of about 2 m/s. Generally the flow rate of air is controlled by monitoring the power of the evacuation fan.

In the present application the terms "bottom", "top", "lateral", "horizontal" and "vertical" are used to describe the relational positioning of features of the invention. These terms should be understood to refer to the dispenser and its internal parts in its/their normal when for the production of a beverage as shown for example in FIGS. 1, 4 and 9.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures, in which.

DETAILED DESCRIPTION OF THE DRAWINGS

Figure 1:
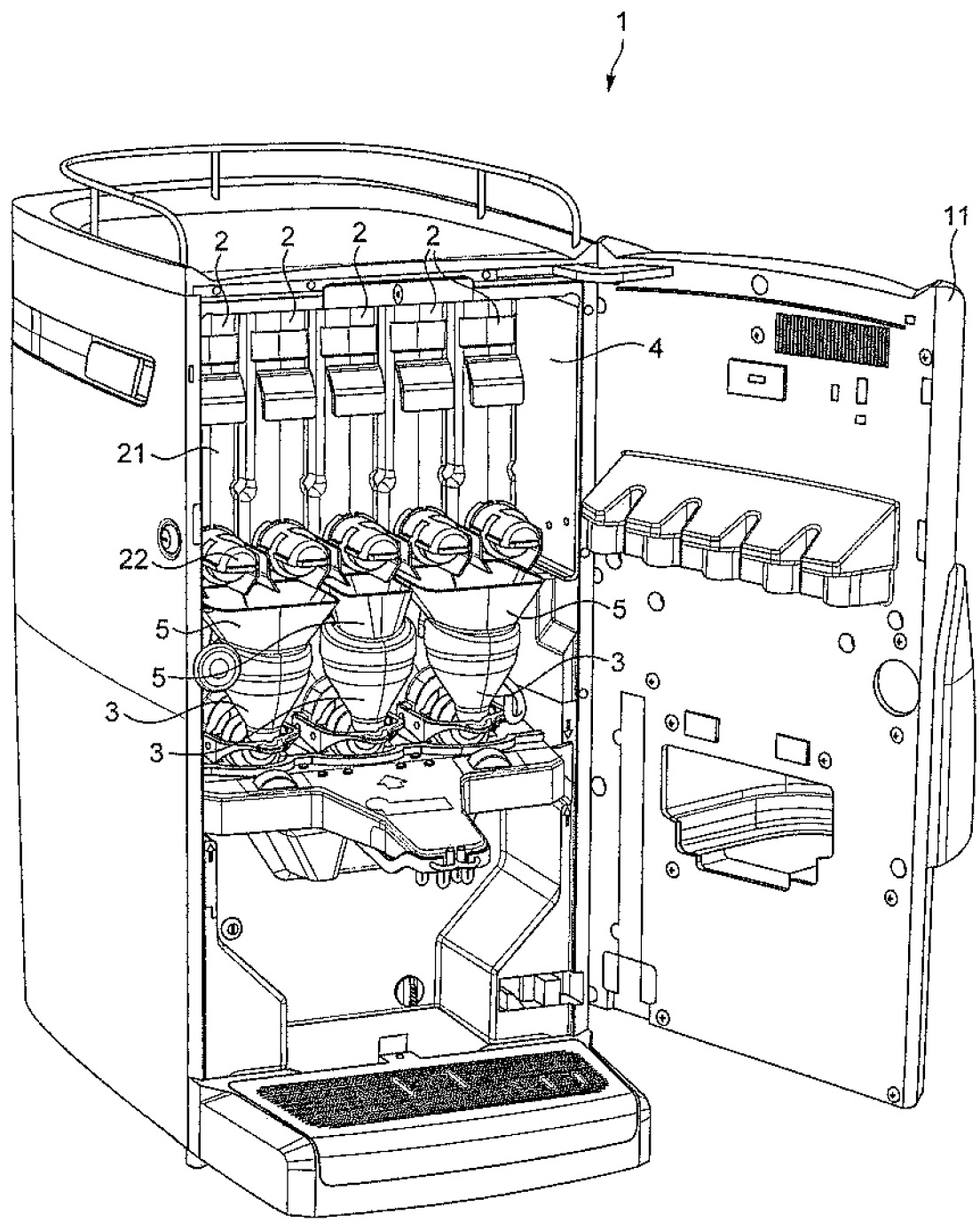
FIG. 1 is a perspective of a beverage preparation dispenser according of the invention with its door opened.

FIG. 1 is a perspective of a beverage preparation dispenser 1 with its door 11 opened. The dispenser comprises a housing 4 in which the different devices for preparing beverages are positioned. The housing 4 of the illustrated dispenser comprises:

- five containers 2 for storing a water soluble beverage powder, each container comprising a tank 21 and an outlet 22.
- three dissolution chambers 3, each being operatively linked to one of the containers 2 for preparing a beverage from the water soluble beverage powder and a diluent.

Each dissolution chamber presents an extractor hood 5 at its top. Each extractor hood device integrates the function of a powder chute as well.

Figure 2:
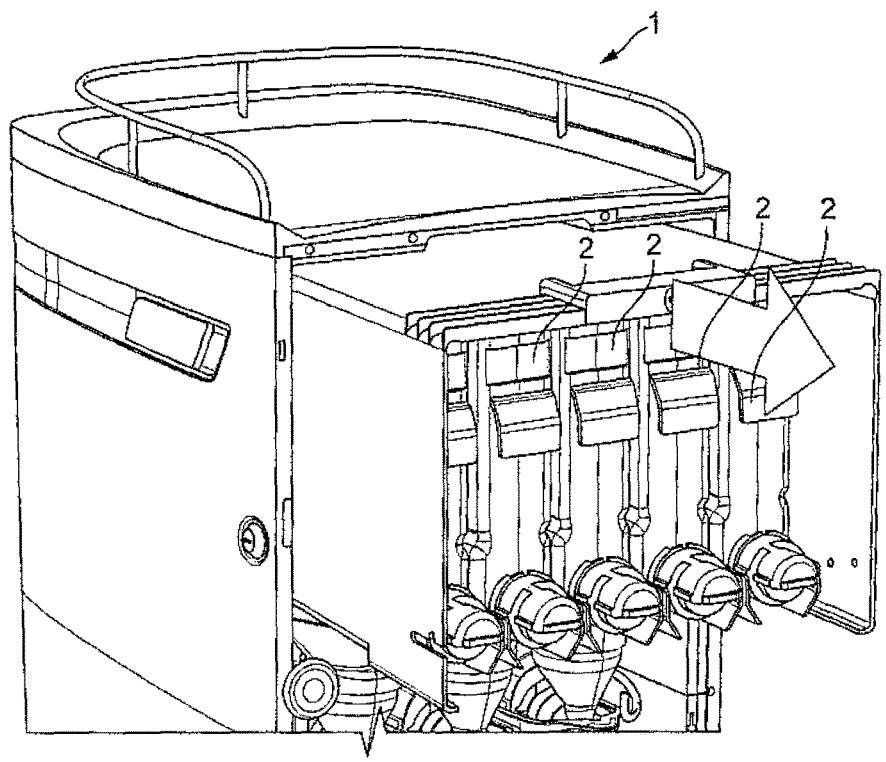
FIG. 2 illustrates the beverage preparation dispenser of FIG. 1 from which containers of soluble beverage powder are being removed.
Figure 3:
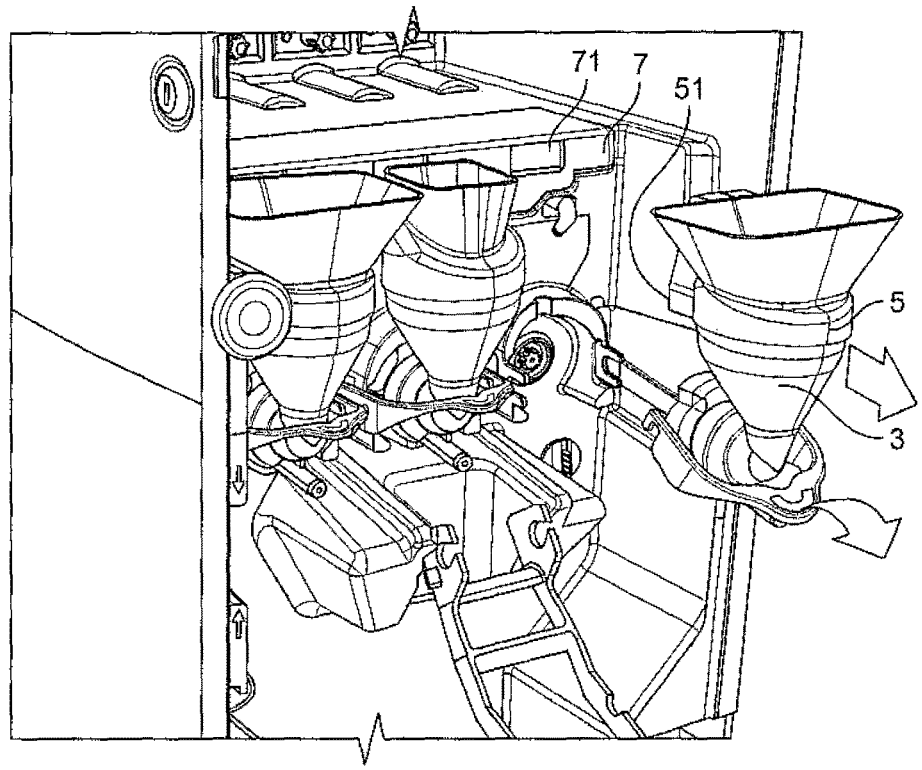
FIG. 3 illustrates the beverage preparation dispenser of FIG. 1 from which a dissolution chamber and its extraction hood is being removed.
Figure 4:
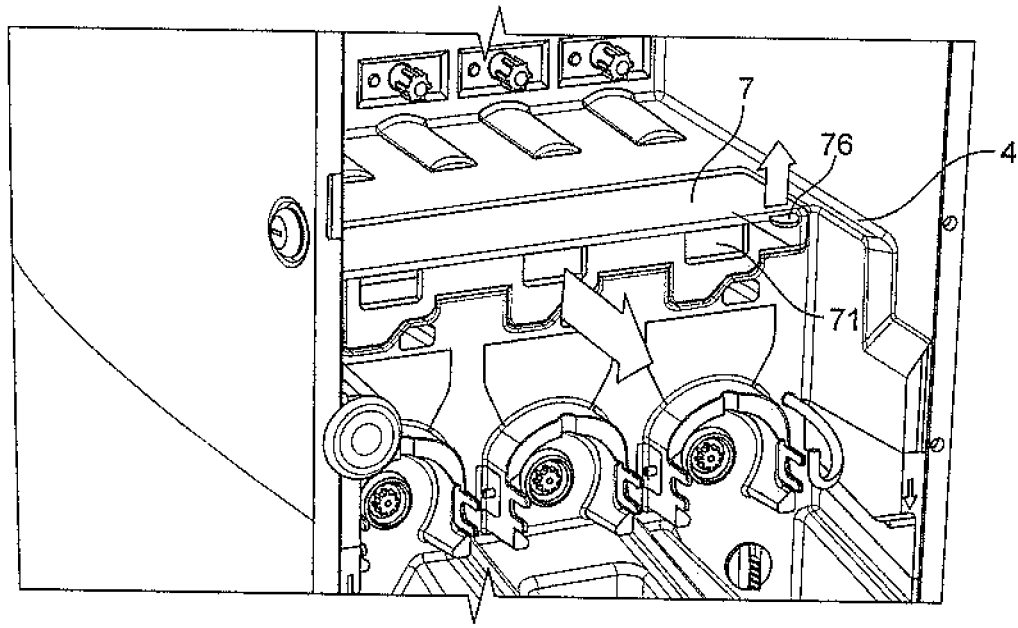
FIG. 4 illustrates the beverage preparation dispenser of FIG. 1 from which all dissolution chambers and its extraction hoods have been removed.

FIGS. 2 and 3 illustrate the removal of the containers 2 and the dissolution chamber 3 with the extractor hood 5 in order to make apparent in FIG. 4 the extraction device 7 positioned in the housing. The extraction device 7 presents three openings 71 configured for cooperating with the openings 51 of the three extraction hoods (illustrated in FIG. 3). The arrows in FIG. 4 illustrate the way to pull the extraction device 7 out of the housing 4. First the operator can lift up a tab 76 on the front side of the extraction device so as to be able to catch the extraction device and pull it out of the housing 4 in a second time.

Figure 5:
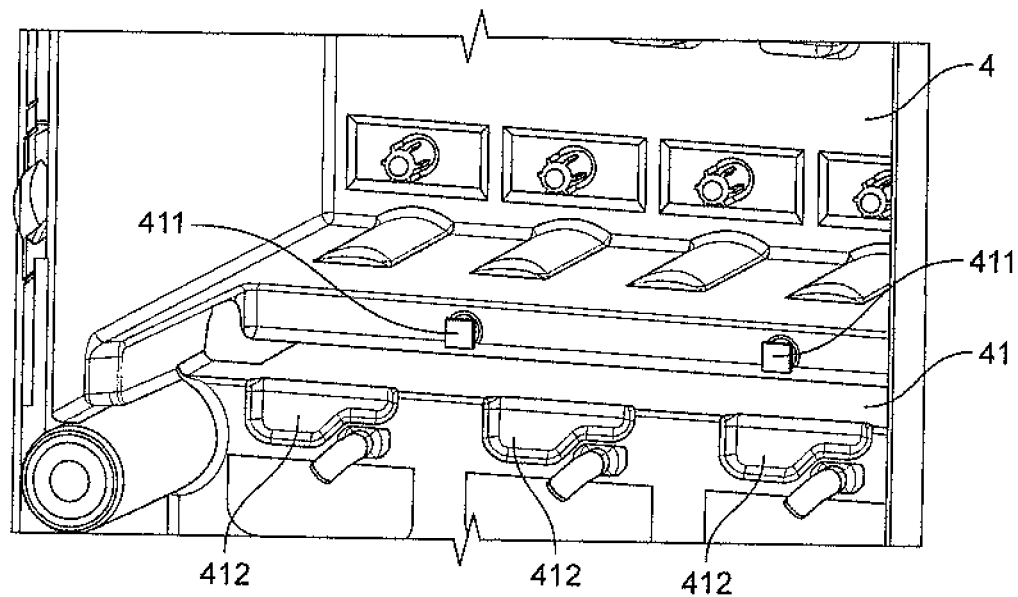
FIG. 5 illustrates the area of the beverage preparation dispenser of FIG. 1 dedicated to the extraction device.

FIG. 5 illustrates the housing 4 from which the extraction device has been removed. The housing presents an area configured for receiving the extraction device. In FIG. 5 it presents the shape of a shelf 41 on which the operator can slide the extraction device. Preferably the area configured for receiving the extraction device comprises means for helping the operator to correctly and easily introduce the extraction device in the housing 4. In the illustrated dispenser, the area comprises magnet or metallic piece 411 positioned for cooperating with corresponding metallic or magnet pieces 77 at the back side of the extraction device. The area can also comprise hollowed out 412 designed for cooperating with corresponding tabs 78 in the front face of the extraction device.

Figure 6A:
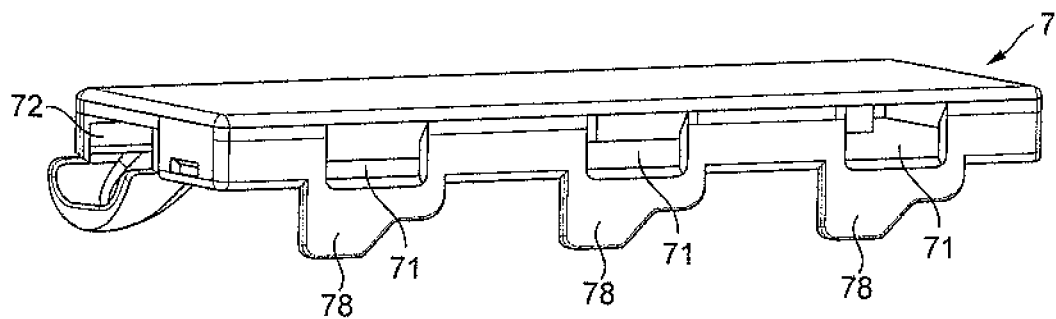
FIGS. 6*a*, 6*b*, 6*c*, 6*d* are perspective views of the extraction device removed from the dispenser.
Figure 6B:
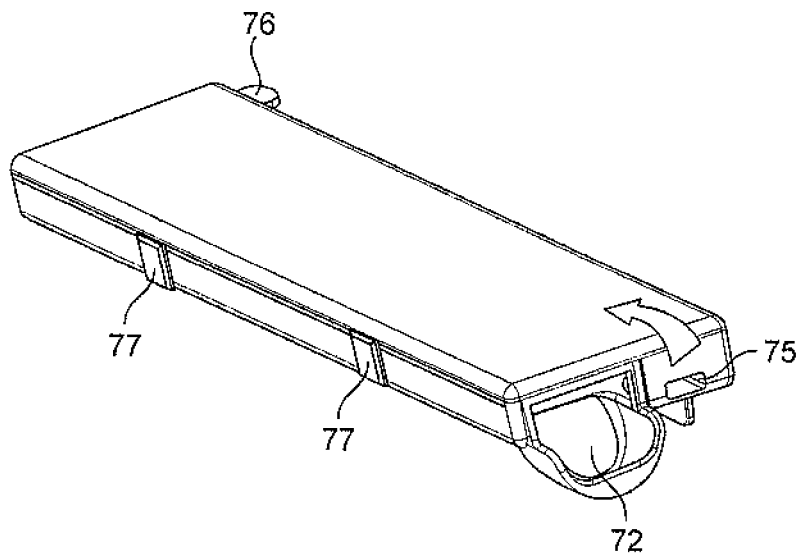
Figure 6C:
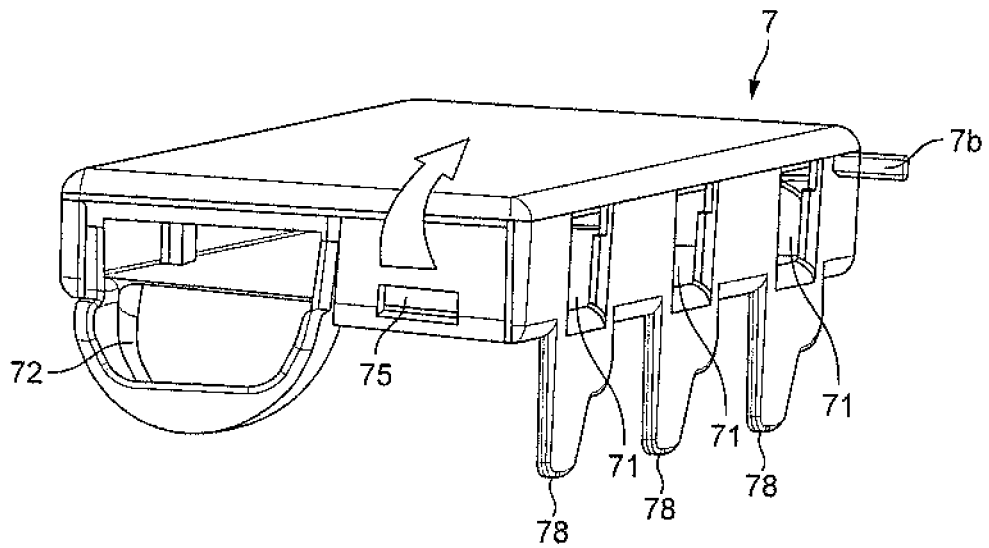
Figure 9:
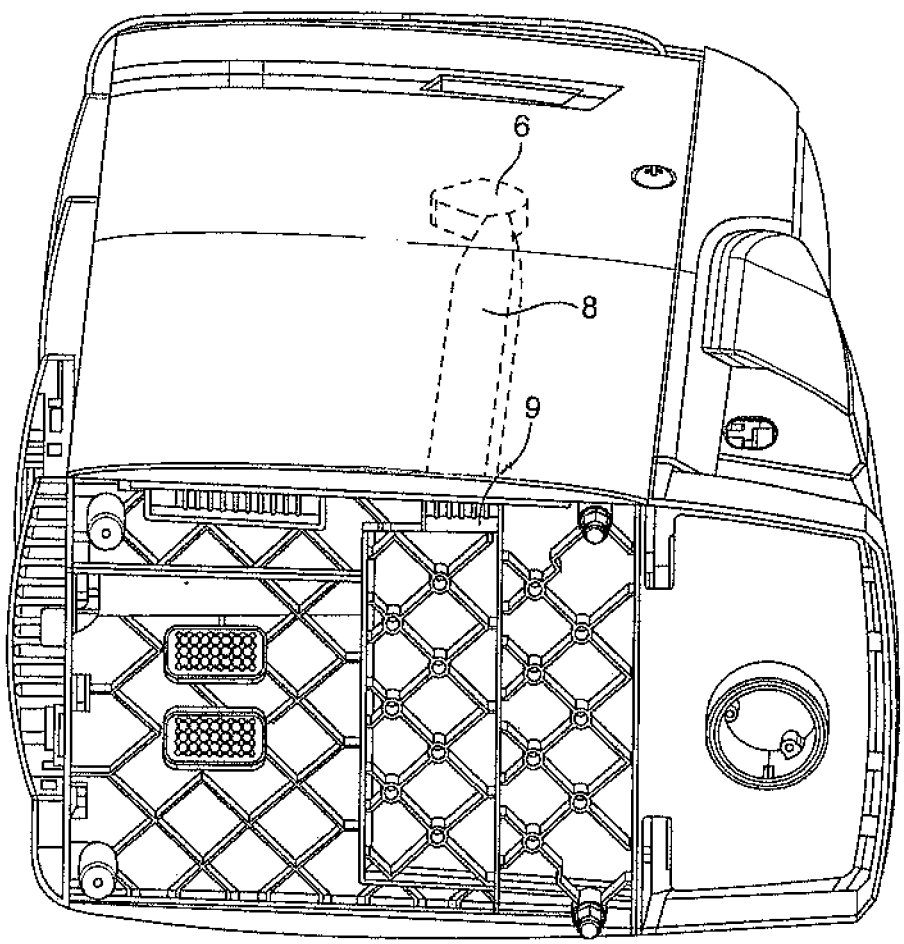
FIG. 9 is a bottom view of a dispenser illustrating the end of the evacuation duct.

FIGS. 6a, 6b and 6c illustrate the extraction device 7 of the dispenser according to the present invention. The extraction device 7 is an essentially parallelepipedic box that is fully removable from the dispenser. It presents:

- on its front lateral face, three openings 71 designed for cooperating with the openings 51 of the three extraction hoods,
- on its side lateral face, one opening 72 designed for cooperating with an evacuating fan 6 (illustrated in FIG. 9). According to a variant said opening 72 designed for cooperating with an evacuating fan 6 can be positioned on the back lateral face too,
- two latches 75 to attach the upper and lower parts 7a, 7b and close the box. Arrows illustrate the way to move the latches in order to open the box.

Figure 6D:
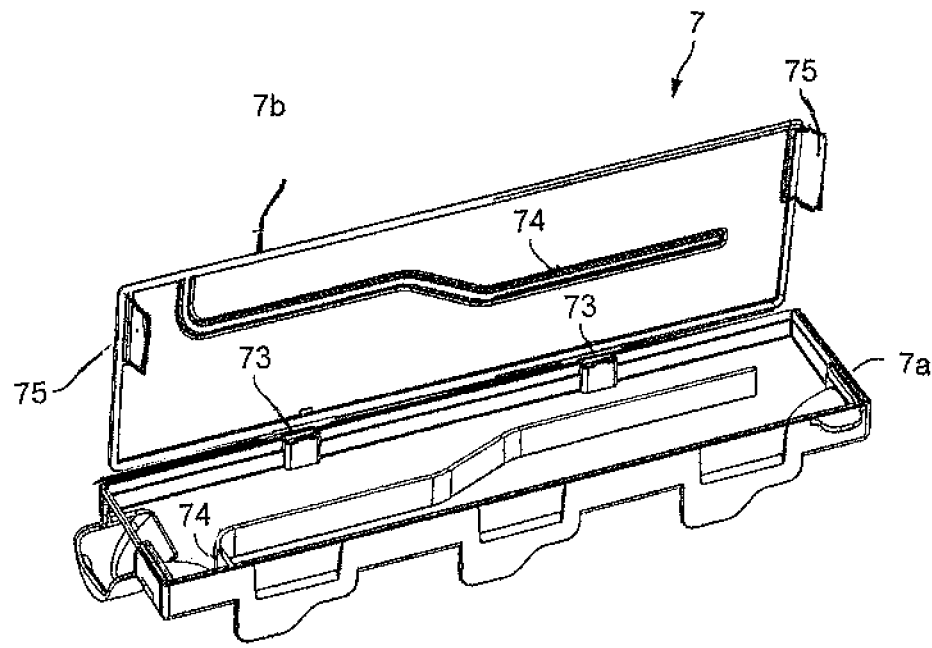

FIG. 6d illustrates the box in its opened state. The latches 75 have been moved up to open the box. The upper and lower parts 7a, 7b remain attached through the hinges 73.

FIG. 6d illustrates the presence of internal walls 74 extending from the lower part surface and the upper part surface of the box of the extraction device to design an internal path for guiding air from the three openings to be positioned in front of the dissolution chambers to the opening in direction of the evacuation fan. In the illustrated embodiment, walls extend from the upper part and the lower part and cooperate together to design the wall 74.

In the illustrated preferred embodiment, the design of the walls 74 is such that they guide the air in the box 7 in order that the flows of air sucked through each of the holes connected to the dissolution chamber are almost equal.

Figure 7:
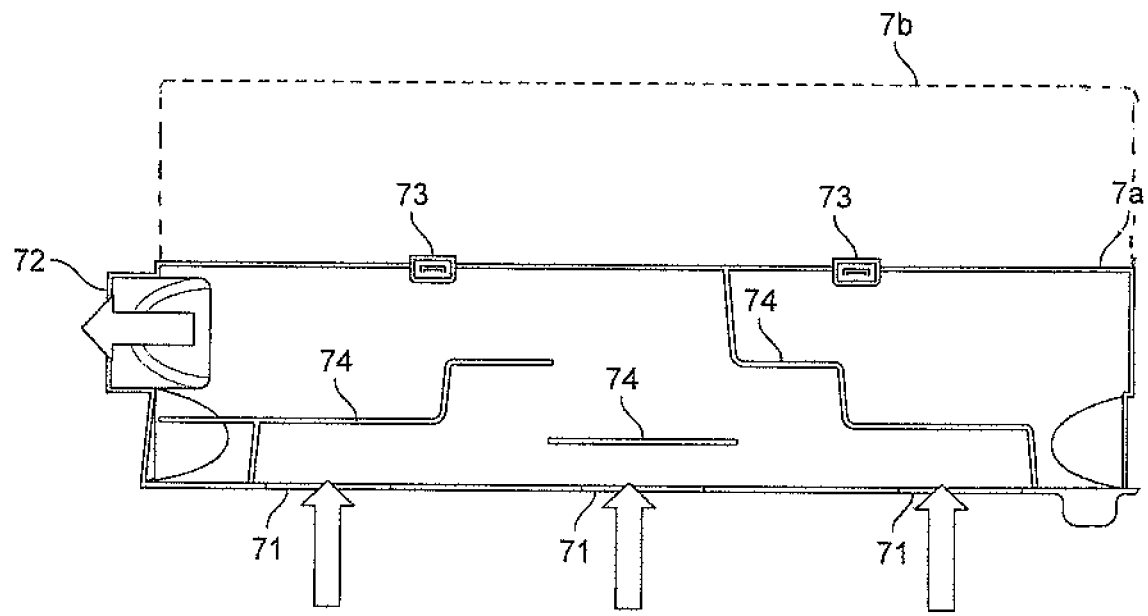
FIG. 7 illustrates an internal design of the extraction device of FIGS. 6a, 6b, 6c, 6d.

FIG. 7 illustrates the internal design of the lower part 7a assembled to the upper part 7b (schematically represented in dotted lines) hinges 73. Hinges 73 are positioned the back lateral side of the box. Yet it could be positioned along other lateral sides equally. The box 7 is openable along said hinges 73. Consequently when air is sucked through the box 7, steam and powder can only deposit inside the internal surfaces of the box 7. It is easy for the operator to fully remove the box 7 from the dispenser and to clean it outside of the dispenser in a convenient manner. The internal walls of the dispenser housing, in particular the receiving area 41 of the housing, are never in contact with steam and powder which significantly reduces dirtiness and risks of malfunctions.

FIG. 7 illustrates the presence of internal walls 74 extending from the lower part surface and the upper part surface of the box of the extraction device to design an internal path for guiding air from the three openings 71 to the opening 72. In the illustrated embodiment, the walls extending from the lower surfaces extend up to the surface or the upper part 7b when the box is closed. According to alternative embodiments, walls can extend from the upper part and the lower part and cooperate together to design the wall(s) 74 or the wall(s) can extend from the upper part surface of the box only. In another variant the walls extending from the upper and lower surfaces can design different walls.

In the illustrated preferred embodiment, the design of the walls 74 is such that they guide the air in the box 7 in order that the flows of air sucked through each of the holes 71 are almost equal. For example, such an extraction device enables the sucking of air at almost equal velocities of about 2.0 m/s through the three openings 71. Such a velocity in an extractor hood 5 cooperating with an opening 71 guarantees that the steam flowing up from the dissolution chamber 3 is sucked but it also avoids that too much powder is sucked from the dissolution chamber simultaneously. Indeed it is important that as less as possible powder is sucked in the extraction device first in order to a avoid dirtiness and secondly because it is a loss of product.

The design of the walls 74 enables too an efficient condensation of steam against the walls and is a trap for the powder fines.

Finally the design of the walls 74 is such that no narrow section is present so that it would not be blocked by powder caking due to the combination of powder deposit and steam condensation on said deposit.

Figure 8:
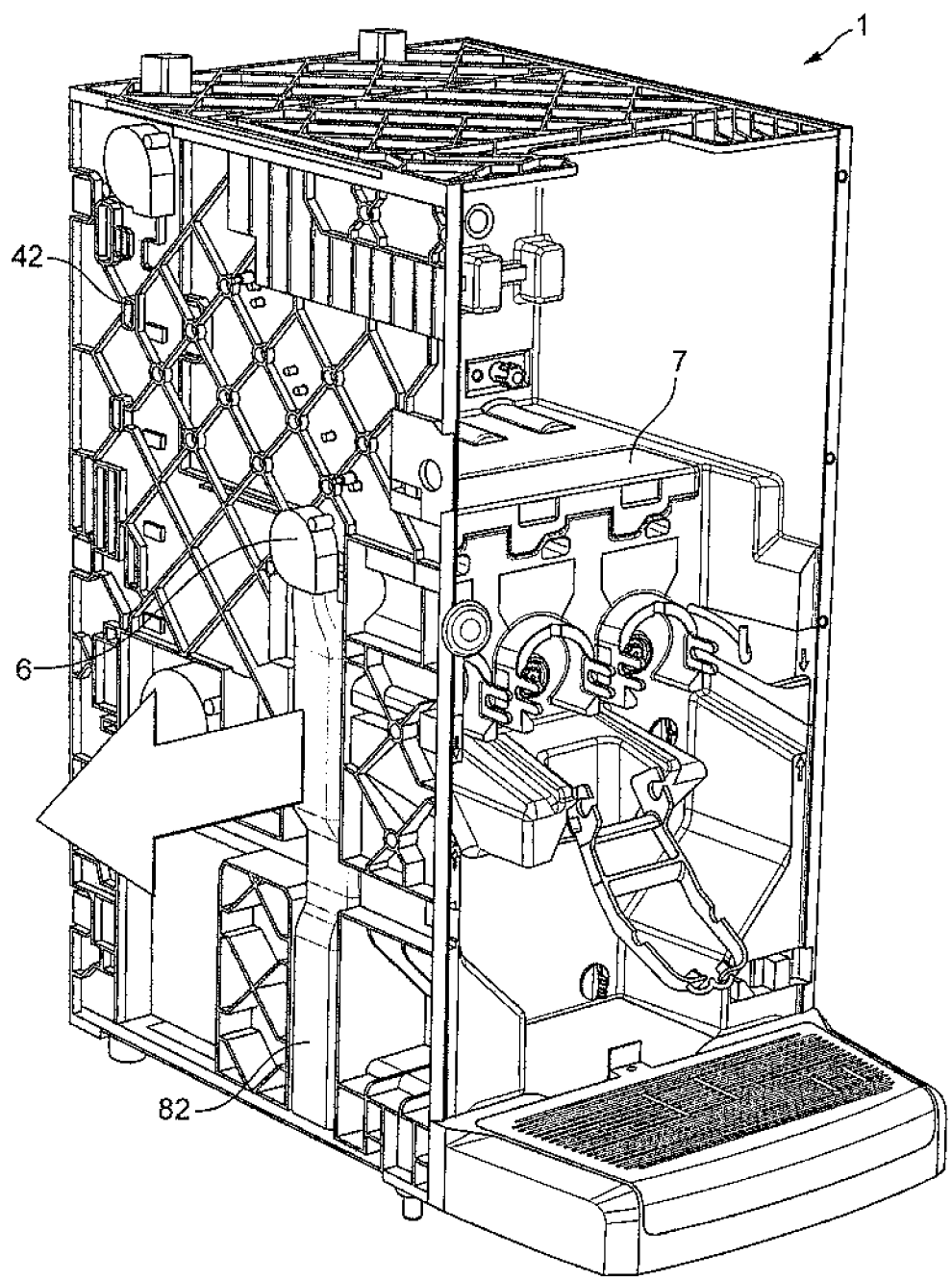
FIG. 8 is a side view of a dispenser illustrating the evacuation duct.

FIG. 8 shows the evacuation fan 6 positioned on the lateral side of the box 7 so as to cooperate with the opening 72. In this view the external lateral decorative panel of the dispenser has been removed in order to show the evacuation duct. The evacuation fan evacuates sucked air through an evacuation duct 8 extending along the vertical side of the housing 4 down to the bottom of the dispenser. FIG. 9 shows the end of the evacuation duct 8 protected by a grid 9. In the illustrated embodiment the evacuation duct 8 is an essentially rectangular conduit consisting in a three longitudinal side conduit attached to the external surface 42 of the lateral wall of the housing. In this embodiment the evacuation duct 8 is very easily dismountable for repairing and cleaning Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

The invention claimed is:

1. A process for the preparation of a beverage with a beverage dispenser comprising:
    a housing;
    at least two containers for storing a water soluble beverage powder, each of the at least two containers comprising a tank and a container outlet;
    at least two dissolution chambers, each of the at least two dissolution containers are operatively linked to one of the at least two containers for preparing the beverage from the water soluble beverage powder and a diluent; each of the at least two dissolution chambers is connected to (i) an extractor hood located at a top of the corresponding dissolution chamber, (ii) an evacuating fan, and (iii) an extraction device connected to each of the extractor hoods and to the evacuating fan, the extraction device comprising a plurality of internal paths for guiding a plurality of air flows from each of the extractor hoods through the extraction device; the extraction device comprising an essentially parallelepipedic box, the essentially parallelepipedic box comprising six walls disposed to each other as a parallelepiped, and the essentially parallelepipedic box is connected to each of the extractor hoods through a plurality of cooperating holes on a front lateral side of the essentially parallelepipedic box and connected to the evacuating fan through one of the plurality of cooperating holes on another lateral side of the essentially parallelepipedic box;
    wherein an entirety of the essentially parallelepipedic box is fully removable from the housing; and
    wherein the essentially parallelepipedic box consists of a lower part and an upper part and is configured for being manually opened by separating the lower part from the upper part;
    the process comprising:
    a) dispensing a dose of the water soluble beverage powder from the container outlet of a first container of the at least two containers to a first dissolution chamber of the at least two dissolution chambers through a chute;
    b) dispensing a dose of the diluent in the first dissolution chamber and mixing the dose of the diluent with the dose of the water soluble beverage powder to produce the beverage; and
    c) dispensing the produced beverage through a chamber outlet;
    wherein, during at least the entire step b), air is sucked from the extraction device so that essentially equal flows of the air are sucked through each of the plurality of cooperating holes cooperating with each of the extractor hoods.

2. The process according to claim 1, wherein the air is sucked from the extraction device during the entire process of claim 1.

3. The process according to claim 1, further comprising controlling a flow rate of the air sucked by the evacuating fan so that the flow rate of the air sucked from each of the plurality cooperating of holes cooperating with each of the extractor hoods is between 1 m/s and 3 m/s.

4. The process according to the claim 3, further comprising monitoring a power of the evacuating fan in order to control the flow rate of the air sucked by the evacuating fan.

5. The process according to claim 1, wherein the lower part of the essentially parallelepipedic box and the upper part of the essentially parallelepipedic box are assembled along a hinge, the hinge being positioned on the front lateral side of the essentially parallelepipedic box or the other lateral side of the essentially parallelepipedic box, the essentially parallelepipedic box being openable along the hinge.

6. The process according to claim 1, wherein the plurality of internal paths for guiding the plurality of air flows from each of the extractor hoods through the extraction device are defined by a plurality of walls internally extending from a component selected from the group consisting of: (i) a surface of the lower part, (ii) a surface of the upper part, and (iii) a combination thereof.

7. The process according to claim 1, further comprising evacuating air sucked from the evacuating fan through an evacuation duct and guiding the air sucked from the evacuating fan down to a bottom of the beverage dispenser.

8. The process according to claim 7, wherein the evacuation duct extends vertically along a lateral wall of the housing.

9. The process according to claim 7, wherein the evacuation duct is an essentially rectangular conduit comprising four longitudinal sides, three of the longitudinal sides being conduit attached to an external surface of a lateral wall of the housing, the fourth longitudinal side being the external surface of the lateral wall of the housing.

10. The process according to claim 1, wherein the essentially parallelepipedic box of the extraction device comprises a magnet or a metallic piece, the magnet or the metallic piece being positioned in order to cooperate with a corresponding metallic piece or a corresponding magnet respectively positioned at a location inside a receiving area of the beverage dispenser.

11. The process according to claim 1, further comprising removing an entirety of the essentially parallelepipedic box from the housing.

12. The process according to claim 11, further comprising placing the entirety of the essentially parallelepipedic box back in the housing after cleaning.

* * * * *